United States Patent [19]

Masters et al.

[11] Patent Number: 5,103,946

[45] Date of Patent: Apr. 14, 1992

[54] BRAKE AND ACCELERATOR CONTROLS FOR HANDICAPPED

[75] Inventors: John V. Masters, Augusta; Norris R. Harod, Martinez, both of Ga.

[73] Assignee: Team Mfg., Inc., Augusta, Ga.

[21] Appl. No.: 609,626

[22] Filed: Nov. 6, 1990

[51] Int. Cl.⁵ ............................................. B60K 41/20
[52] U.S. Cl. ................................... 192/1.52; 74/481
[58] Field of Search ................ 192/1.52; 74/481, 482

[56] References Cited

U.S. PATENT DOCUMENTS

| | | | |
|---|---|---|---|
| 2,523,491 | 9/1950 | Auten | 192/1.52 |
| 2,602,348 | 7/1952 | Wilson | 192/1.52 X |
| 2,707,886 | 5/1955 | Lerman | 74/481 |
| 2,724,285 | 11/1955 | Lerman | 192/1.52 X |
| 2,777,335 | 1/1957 | Engberg et al. | 192/1.52 X |
| 2,855,797 | 10/1958 | Dunn | 192/1.52 X |
| 4,436,191 | 3/1984 | Perry | 192/1.52 |
| 4,627,522 | 12/1986 | Ulrich et al. | 74/481 X |
| 4,788,879 | 12/1988 | Ulrich | 192/1.52 X |
| 4,946,013 | 8/1990 | Conlyn, Jr. et al. | 192/1.52 |
| 4,998,983 | 3/1991 | Ruprecht et al. | 192/1.52 |

FOREIGN PATENT DOCUMENTS 1539880 2/1979 United Kingdom ............... 192/1.52

Primary Examiner—Leslie A. Braun
Assistant Examiner—Nicholas Whitelaw
Attorney, Agent, or Firm—Laurence R. Brown

[57] ABSTRACT

A hand operated automobile brake and accelerator operation assembly for the handicapped can be readily transferred from car to car without tools and is adaptable to various models of cars. It is installed by clamping onto the brake pedal shaft with manually operable wing nuts or the like as the sole fixed connecting bracket on the car. The brake pedal and accelerator pedal are respectively operated by pushing and pulling by hand an operating rod to move an operating lever fulcrumed on a pivot axis fixed relative to the brake pedal shaft. This operating lever moves an accelerator operating shaft into contact with the accelerator pedal to depress it as the hand operated rod is pulled. Conversely when pushed the hand operated rod depresses the brake pedal and release the accelerator. To accommodate different car models an accelerator operating shaft has a manually operated lock to fix its length. and the acclerator assembly distance from the brake is adjustable. Thus the assembly can be installed and changed from car to car with few or no tools.

5 Claims, 3 Drawing Sheets

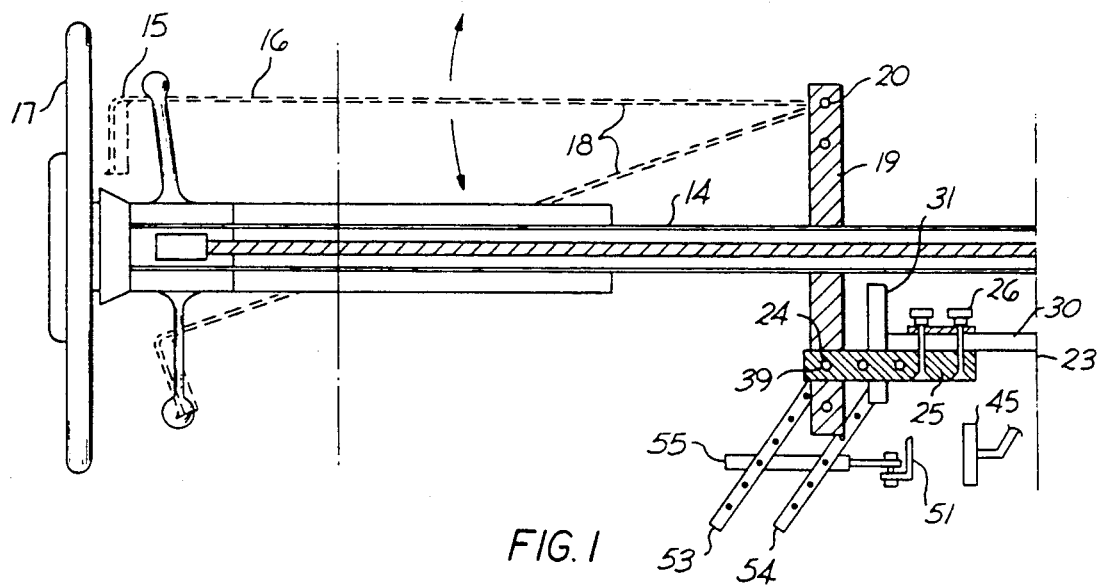
FIG. 1
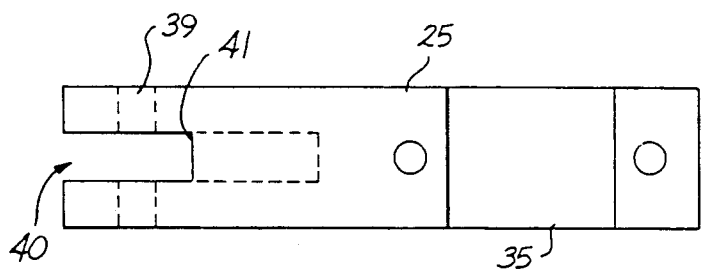
FIG. 3
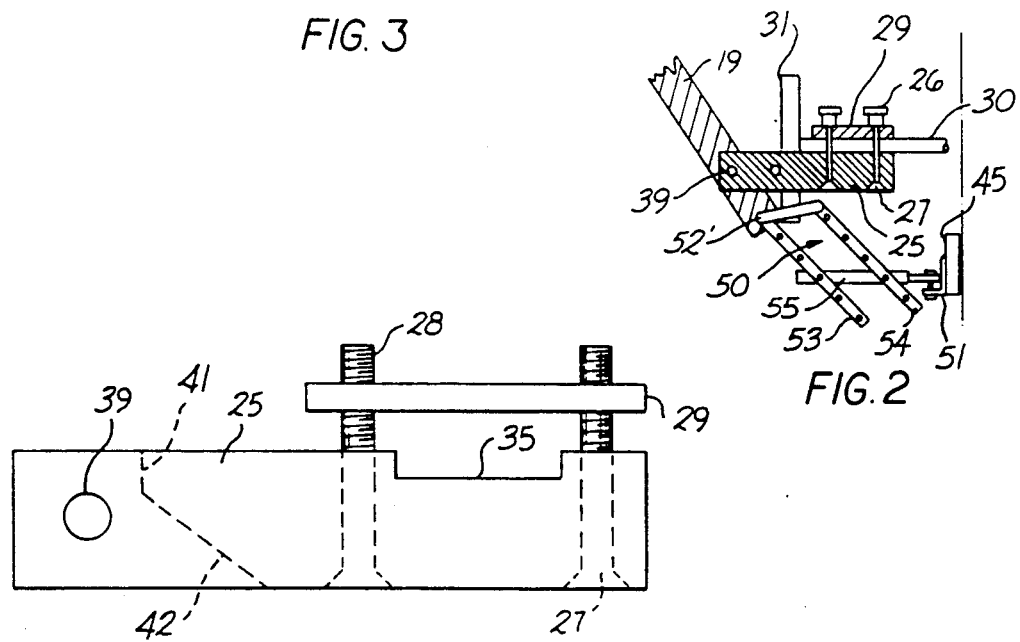
FIG. 2
FIG. 4

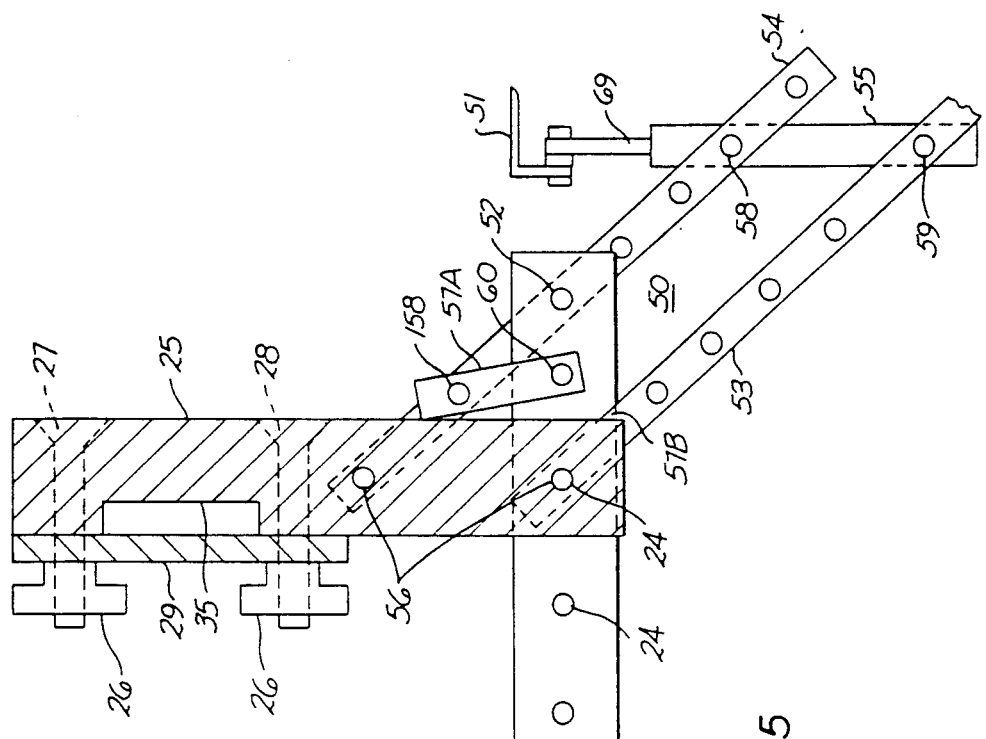
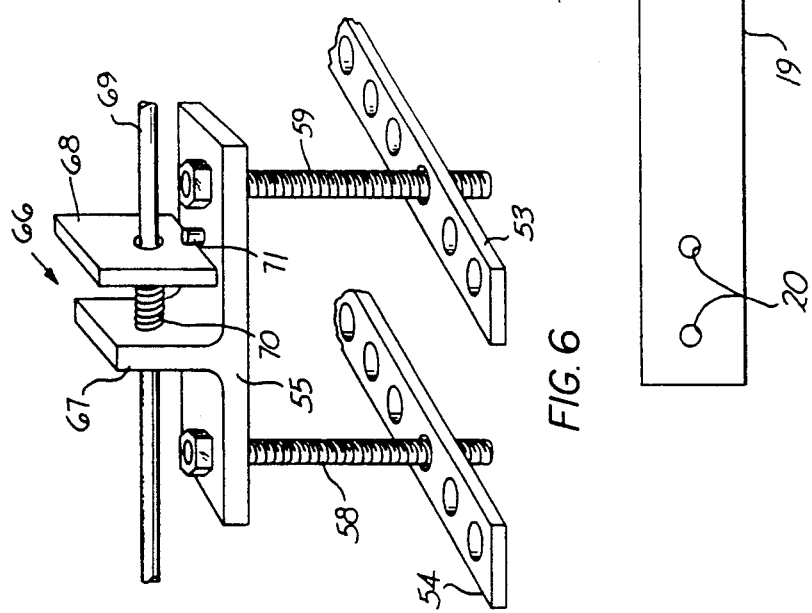
FIG. 5
FIG. 6

BRAKE AND ACCELERATOR CONTROLS FOR HANDICAPPED

TECHNICAL FIELD

This invention relates to driving controls for automobiles and more specifically it relates to mechanisms for manual operation of automotive brake and accelerator pedals that may be used by handicapped drivers.

BACKGROUND ART

As related in our U.S. Pat. No. 4,946,013, Aug. 7, 1990, entitled Apparatus for Manual Operation of Vehicle Brake and Accelerator Pedals, it is possible for handicapped persons without full control of the legs and feet to operate both brake and accelerator pedals by a simple manually operated hand controlled lever mechanism. It has been found, however, that such prior art controls have disadvantages when a handicapped person wishes to drive more than one automobile upon which a mechanism is attached because they are not adaptable to be simply moved from car to car. This is true because the dimensions between brake and accelerator pedals and the length of operating strokes of each pedal change drastically from one model of automobile to another. Thus, there has been no truly "universal" unit that can be changed from car to car without tools, for example.

It is therefore an object of the present invention to provide improved hand operated brake and accelerator control mechanisms that can be installed with few or no tools on various automobile models, and which has advantages in operational performance.

DISCLOSURE OF THE INVENTION

A pantograph type mechanism transforms a nearly linear back and forth motion of a hand held manipulating handle positioned near the automobile steering wheel, and preferably in the operators lap, into corresponding respective application of braking and accelerating forces.

The entire control mechanism is mountable upon the brake pedal shaft as the sole bracketed coupling to the car by means of a simple manually applied wing nut clamp assembly permitting quick installation and removal to reposition in another automobile. Simple manually adjustable means is provided to adjust to the relative stroke lengths of brake and accelerator pedals of various models of automobiles.

The accelerator and brake actuating assembly thus has a hand controlled lever mechanism with mounting means for operably positioning the system in operational position in the automobile by connection to a single mounting position on a reciprocating brake pedal shaft. A hand controlled lever mechanism with a reciprocating hand control member is thus affixed to the automobile manually without tools for hand control operation by reciprocation of a hand control member. This control member is pulled in one direction for operating the accelerator and pushed in the opposite direction to operate the brake.

Further objects features and advantages of the invention will be found throughout the following description, drawings and claims.

BRIEF DESCRIPTION OF THE DRAWINGS

In the separate views of the drawings, like reference characters refer to similar features for ready comparison, and:

FIG. 1 is a diagrammatic side view of a fragmental portion of a typical drivers compartment of an automobile in which the brake and accelerator control mechanism afforded by this invention is shown in the braking position;

FIG. 2 is a corresponding fragmental view of a further embodiment with the control mechanism shown in the accelerating position;

FIGS. 3 and 4 are respective detailed top view and side view sketches of the mounting clamp assembly for affixing the control mechanism of this invention to a brake pedal shaft;

FIG. 5 is an enlarged side view sketch, of the embodiment shown in FIG. 1, of a dismounted control mechanism afforded by this invention;

FIG. 6 is a perspective fragmental sketch showing a manually adjustable accelerator pedal actuation shaft feature of this invention;

THE PREFERRED EMBODIMENT

Figure 7:
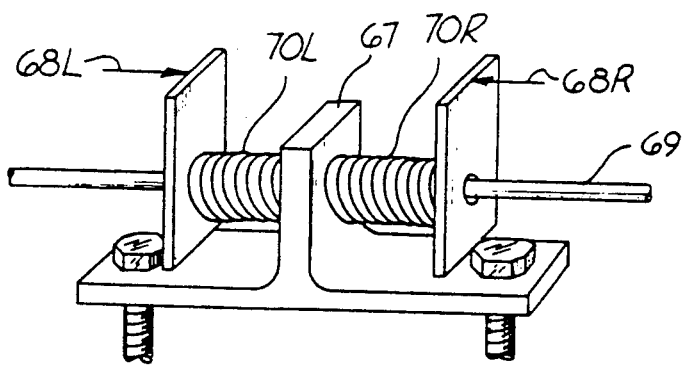
FIG. 7 is a further embodiment showing of the adjustable shaft feature.

As may be seen from FIG. 1, the control mechanism of FIG. 5 can be installed in an automobile for operating the brake and accelerator pedals by means of a reciprocating hand operated handle 15, and reciprocating control rod 16 with accompanying braking and accelerating control means. The handle 15 and rod 16 are shown in different phantom positions, as positionable in an automobile driver's compartment generally parallel to column 14 of the steering wheel 17, preferably to rest in a drivers lap for comfort and reduced fatigue. The phantom positions and accompanying arrowheads illustrate the pivoting of the manually controlled operating rod 16 over an angle 18 between the locations respectively for right and left handed operation.

The operating rod 16 is pivoted at one end of control arm lever 19 in one of the variably positioned apertures 20 that permit adaptability to different models of cars. The control arm lever 19 is fulcrumed at a selected one of several laterally positioned apertures 24 to the braking shaft 25. This shaft 25 is clamped by plate 29 to the brake pedal shaft 30, which extends through a fire wall compartment 23 of the car driver's chamber. The entire operating assembly is clamped in operational position by manually operable wing nuts 26 coupled to bolts 27, 28 to secure clamping plate 29 to the brake pedal shaft 30 for reciprocation and braking when the brake pedal 31 is operated by a driver's manipulation of the hand grip 15. The various apertures 24, 24', 24" can vary the spacing between brake and accelerator operating members, thus to permit custom fitting to a variety of car models.

As seen in FIGS. 3 to 5, the slot 35 in the braking shaft 25 accommodates the control lever arm 19. With the single mounting position to the automobile located on the brake pedal shaft, the advantages of simple removal by a handicapped person to carry from car to car, or by a non-handicapped person who also uses a car, without special tools are readily realized.

In the braking operation, illustrated in FIG. 1, the operating rod 16, via handle hand grip 15, is reciprocated toward the fire wall 23 to manually depress the braking pedal 31. As best seen from FIGS. 3 and 4, the notch 40 and a pivot pin through aperture 39 which serves as a pivot axis for the relative motion of the control arm lever 19 relative to the braking shaft 25 is arranged to confine and limit movement of the control arm lever 19. Thus stops 41 and 42 respectively define two limiting swivel positions of control arm lever 19 as shown in FIGS. 1 and 2 respectively for braking and accelerating as control rod 16 is respectively pushed or pulled. Thus, for "pushing" on the operating rod 16 to apply the brakes, FIG. 1, stop 41 is encountered. Conversely for "pulling" on the operating rod 16 to depress the accelerator pedal 45, stop 42 is encountered.

For depressing the accelerator pedal 45, the pantographic type mechanism comprising a parallelogram 50, or equivalent, as best seen in FIG. 5, moves the acceleration pad 51 as a function of the movement of control lever arm 19 about a pivot axis about fulcrum 24 (pivot axis 39) on braking shaft 25 by means of control arm lever 19 as "pulled" by manual operating rod 16. The two parallel arms 53, 54 of the pantograph have spaced apertures 56 for the purpose of adjusting the mechanism to the different spacings between brake and accelerator pedals in different car models. The acceleration pad actuating arm 55, as best seen in FIGS. 5 and 6, thus mounts with bolts 58, 59 in a position substantially parallel with the braking shaft 25 so that acceleration pad 51 mates with the car accelerator pedal (45). The pantograph then reciprocates the acceleration pad actuating arm 55 axially in response to pivoting of control arm lever 19 over a limited reciprocation span between its limit stops (41, 42) within the braking shaft member 25 slot 40.

The remaining pantograph arm 57A, 57B pivots on arms 53, 54 at pivot axes 58 and 24 by way of intermediate pivot axis 60, and thus constitutes a compound member substantially parallel to the acceleration pad actuating arm 55. The intermediate linkage on control lever arm pivot point 60, provides direct control arm lever 19 actuation to both arms 53 and 54 from respective pivot points 24 and 60 to the pantograph mechanism 50 for corresponding movement of the acceleration pad 51 to better follow the accelerator pedal movement during acceleration and deceleration. This embodiment is shown in FIG. 1 and an alternative embodiment with a conventional parallelogram pantograph in the FIG. 2 embodiment, wherein the single pivot point 52' is on the control lever arm 19.

In FIG. 6 the shaft length adjusting mechanism 66 for adjusting the effective length of the acceleration pad actuating arm 55 for differences in car models is shown in a preferred embodiment for simple quick manual adjustment without tools. Thus the mechanism 66 locks shaft 69 in place, as shown wherein the apertured plates 67 and 68 are held apart at stop limit 71 by spring 70. When the top of the plates 67 and 68 as shown in the drawing are manually squeezed, the shaft 69 may be moved in either direction to establish a desired effective length to the acceleration pad actuating arm assembly 55 that terminates in the accelerating pad 51.

Thus the pair of relatively movable apertured plates 67, 68 about the operating shaft 69 for the accelerator pedal, as biased apart by spring 70, lock the shaft 69 in fixed position in the plate apertures, when plate 68 is positioned at stop 71, until the apertured plates are manually moved towards each other to release the shaft 69 from its locked position for repositioning to a different length.

To initially adjust the length of the acceleration pad actuating arm, as viewed from FIGS. 1 and 2, while the engine is running the brake pedal is pushed to maximum braking position by means of operating rod 16, and in this position the acceleration pad 51 is moved close to the accelerator pedal 45, but not in contact. Removal of the unit simply requires manual actuation of the two wing nuts 26 whenever desired. If moved to different car models, then some adjustments with simple tools such as wrenches or screwdrivers can be made to fit the various mechanism elements into the preferred adjustment apertures.

In the FIG. 7 embodiment, two side plates 68R and 68L are squeezed against the bias of springs 70R, 70L to unlock the rod 69 for movement.

Figure 8:
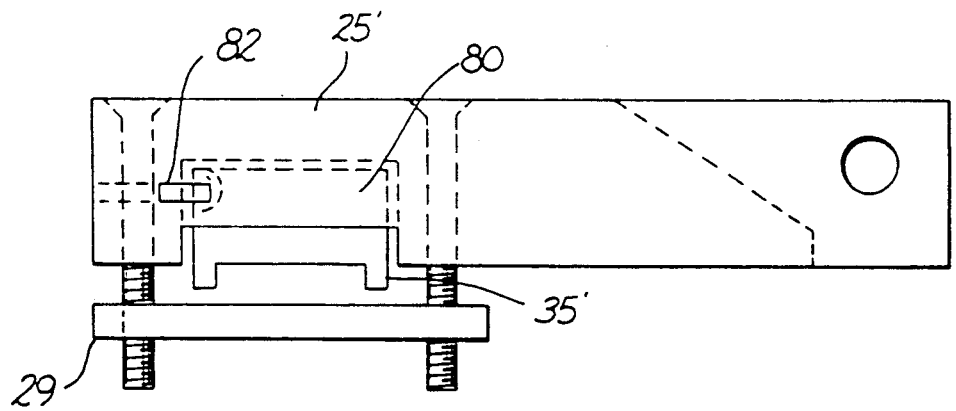
FIG. 8 shows a preferred embodiment of the mechanism for mounting on a brake pedal shaft.
Figure 9:
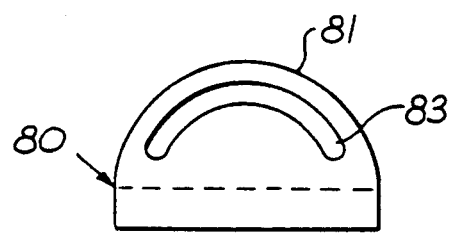
FIG. 9 shows a side view of a pivotable insert for the mechanism of FIG. 8.

In FIGS. 8 and 9, the braking shaft is modified and thus carries reference numeral 25'. This permits installation where the angle at which the brake arm is installed varies in opposite directions from vertical while maintaining the overall assembly level.

Thus the slot 35 for clamping onto the braking shaft is pivotably mounted by means of the pivotable member 80 having its rounded top surface 81 journalled within the braking shaft body. On one end a fixed or spring biased retractable pin 82, or the like, mates into a milled slot 83 in the side of the pivotable member 80 to hold the assembly in place for pivoting over an arc of predetermine angle.

Tightening of screws on the bolts to clamping plate 29 frictionally holds the pivotable member in place at the desired pivot angle to conform with the particular brake shaft angle of the resident car.

Having therefore advanced the state of the art, those features of novelty defining the spirit and nature of the invention are set forth with particularity in the following claims.

We claim:

1. A manually controlled operating system for permitting a handicapped person to brake and accelerate an automobile with a brake pedal mounted on a brake pedal shaft and an accelerator pedal with hand operated controls, comprising in combination, a reciprocatable hand control lever mechanism with a single operating handle extending from a control unit for respectively operating brakes and accelerator of an automobile attached to the automobile by means clamping said unit in operational position to brake and accelerate said automobile at a single mounting position on said brake to move with the brake pedal shaft, a control lever arm reciprocated by means of said hand control lever unit fulcrumed at a fixed position on said unit relative to the brake pedal shaft for operating the accelerator pedal, and a pantograph type position control mechanism coupled between said control lever arm and said accelerator pedal.

2. The system of claim 1 wherein said pantograph mechanism comprises four pivoted arms substantially coupled together as a parallelogram.

3. The system of claim 1 wherein said pantograph mechanism comprises two substantially parallel arms pivoted respectively to an accelerator pedal depressing shaft, said control lever arm and a pivotable link member pivoted on said control lever arm.

4. A manually controlled operating system for permitting a handicapped person to brake and accelerate an automobile with a brake pedal mounted on a brake pedal shaft and an accelerator pedal with hand operated controls, comprising in combination,
- a reciprocatable hand control lever mechanism with a single operating handle extending from a control unit for respectively operating brakes and accelerator of an automobile attached to the automobile by means clamping said unit in operational position to brake and accelerate said automobile at a single mounting position on said brake to move with the brake pedal shaft,
- an adjustable length accelerator operating shaft, and means for adjusting said operating shaft, and means for adjusting said operating shaft length manually without the help of tools to control the distance of the shaft from the accelerator,
- wherein said means for adjusting the operating shaft length comprises a pair of relatively movable apertured plates about said operating shaft biased apart by a respective springs about the operating shaft to lock the shaft into the apertured plates to extend therefrom at a predetermined length until the apertured plates are manually moved towards each other to release the shaft from its locked position for repositioning to a different length.

5. A manually controlled operating system for permitting a handicapped person to brake and accelerate an automobile with a brake pedal mounted on a brake pedal shaft and an accelerator pedal with hand operated controls, comprising in combination,
- a reciprocatable hand control lever mechanism with a single operating handle extending from a control unit for respectively operating brakes and accelerator of an automobile attached to the automobile by means clamping said unit in operational position to brake and accelerate said automobile at a single mounting position on said brake to move with the brake pedal shaft,
- an adjustable length accelerator operating shaft, and means for adjusting said operating shaft length manually without the help of tools to control the distance of the shaft from the accelerator,
- wherein means clamping the lever mechanism in operational position comprises a pivotable clamping member that aligns with car brake shafts disposed at different angles.

* * * * *